US005894396A

United States Patent [19]

Kim

[11] Patent Number: 5,894,396

[45] Date of Patent: Apr. 13, 1999

[54] INRUSH CURRENT PROTECTION CIRCUIT

[75] Inventor: You-Ho Kim, Incheon, Rep. of Korea

[73] Assignee: Daewoo Electronics Co., Ltd., Seoul, Rep. of Korea

[21] Appl. No.: 08/980,823

[22] Filed: Dec. 1, 1997

[30] Foreign Application Priority Data

Jun. 19, 1997 [KR] Rep. of Korea ........................ 97-25632

[51] Int. Cl.$^{6}$ ........................ H02H 5/00

[52] U.S. Cl. ........................ 361/103; 361/93; 361/115

[58] Field of Search ........................ 361/103, 58, 93, 361/115, 23, 24, 25, 8, 13

[56] References Cited

U.S. PATENT DOCUMENTS

| | | | |
|---|---|---|---|
| 4,798,927 | 1/1989 | Kaminaka | 219/10.55 B |
| 4,800,329 | 1/1989 | Masaki | 323/242 |
| 5,250,774 | 10/1993 | Lee | 219/10.55 B |
| 5,625,520 | 4/1997 | Lim | 361/103 |

*Primary Examiner*—Jeffrey A. Gaffin
*Assistant Examiner*—Stephen W. Jackson
*Attorney, Agent, or Firm*—Pillsbury Madison & Sutro LLP

[57] ABSTRACT

An inrush current protection circuit for preventing generation of inrush current when an AC voltage is intermittently applied to a load, and an application of the circuit to a microwave oven. A switch is interposed between a power source for supplying an AC signal and a load. A positive characteristic thermistor, which restricts a magnitude of a current applied to the load to a predetermined value even when an inrush current of over a predetermined magnitude is applied thereto, is interposed between the power source and the load and connected in parallel to the switch. A DC relay provides to the switch a signal for turning ON the switch which is energized by the DC signal provided from a rectifier after a delay time passes from the time that the AC signal is inputted to the rectifier and is turned OFF. The turned-ON switch is provided to a bypassing circuit of the positive characteristic thermistor, and the AC signal is supplied to the load through the positive characteristic thermistor for the predetermined delay time from the time that the AC signal is received, and is supplied to the load through the switch after the predetermined delay time passes, thereby effectively cutting off the inrush current generated during when a power is intermittently supplied. The inrush current protection circuit can be employed to a power source of a microwave oven to prevent the inrush current from be flowing into a high voltage transformer.

6 Claims, 4 Drawing Sheets

INRUSH CURRENT PROTECTION CIRCUIT

BACKGROUND OF THE INVENTION

1. Field of the Invention

The present invention relates to an inrush current protection circuit and an application thereof, and more particularly to an inrush current protection circuit which applies to a load an inrush current initially generated when an alternating current is applied thereto and having a magnitude thereof reduced, thereby protecting the load from electrical damage, and to an application of the circuit to a power source of a microwave oven.

2. Description of the Prior Art

A high voltage is generally needed to drive a magnetron of a conventional microwave oven, and a high voltage transformer is used for the high voltage.

A drive voltage which is supplied to the high voltage transformer of the microwave oven and to a load connected to a second coil thereof should be stable. In relation to a drive power supply of such a microwave oven, technologies for supplying stable powers to loads are disclosed in U.S. Pat. No. 4,798,927 issued to Accuse Kaminaka, U.S. Pat. No. 5,250,774 issued to Kong-Keen Lee, and U.S. Pat. No. 5,625,520 issued to Bung Ap Lam.

In the U.S. Pat. No. 4,798,927, Kaminaka suggests a technology for selectively and intermittently supplying an electric current to microwave and heat ovens by appropriately combining switching means corresponding to cooking modes, thereby maintaining a temperature of the ovens at a predetermined value and also making it possible to cook food without any extension of cooking time. In the U.S. Pat. No. 5,220,774, Lee suggests a technology for preventing instability of output voltage due to LC resonance between a high voltage condenser and a secondary winding of a high voltage transformer, and thereby preventing damage of a magnetron due to a high voltage and providing a stable power to the magnetron, by interposing a diode between the secondary winding of the transformer and the condenser for driving the magnetron and thus variably inducing the output voltage of the transformer depending on a feedback voltage. In the U.S. Pat. No. 5,625,520, Lim suggested a device for preventing a high voltage transformer from being overheated. Lim's device directly senses a temperature in a second coil of the transformer and uses a thermostat to control a power supply to a first coil of the transformers according to the detected temperature.

On the other hand, there is a need to intermittently supply a drive power to a high voltage transformer in order to prevent a magnetron from being overheated. Particularly, in a power source of a mechanical microwave oven, a drive power is intermittently supplied to a first coil of a high voltage transformer according to a selected cooking time and a high frequency output level. However, the intermittent supplying of the drive power is accompanied by an inrush current, which applies electrical impacts to the power source and generates flickering in the power source. Therefore, the high voltage transformer is required to be provided with a stable voltage, while minimizing variations in the drive power source.

Referring to FIG. 4, a drive mechanism of a power source in a conventional microwave oven is shown. After a food to be cooked is placed in a cooking chamber and then first and second doors are closed, switches 110*a* ad 110*b* of the doors are turned ON. In this state, a user uses an output regulating knob (not shown) to select an output of a magnetron 126 and uses a timer knob (not shown) to set a cooking time. Then, a timer switch 104 is turned ON to drive a timer motor 106, and in turn, to drive a cavity lamp 142, a turn table motor 144, and a cooling fan motor 146. A variable power control switch 108 is periodically turned ON and OFF according to control signals of the timer motor 106 to intermittently operate the magnetron 106. The intermittent power supply to the magnetron prevents the food to be cooked from being overheated.

However, an output wave of the control switch 108, immediately after the control switch 108 is switched ON, includes an inrush current of over a predetermined magnitude as indicated by "A" in FIG. 3. In case such an inrush current is directly applied to a first winding 128 of a high voltage transformer 120, an electrical impact which is generated by the inrush current can impair endurance of the device and can also cause flickering, which undesirably affects a health of a human body and operations of peripheral devices. For this reason, in European nations, a regulator named "Flicker" is provided to regulate a voltage variation of an input power source at an amount proportional to the amount of the inrush current, and to strictly control product standards of electrical devices. The inrush current should be effectively controlled to satisfy the product standards.

In order to prevent the inrush current, as shown in FIG. 4, there are provided a fuse 114, a cement resistor 112 connected in parallel to the fuse 114, an AC relay 116, and a bypassing switch 110 associated with the AC relay 116. When an energized current is applied to the AC relay 116 and the AC relay 116 sends an operation signal to the switch 110 after a delay which is a self-response time needed to energize an energizing coil. As a result, the inrush current generated immediately after the control switch 108 is turned ON is flowed to the cement resistor 112 and damped during the response time, and then is bypassed to the switch 110.

The fuse 114 is provided to prevent the AC relay 116 from being unintendedly turned ON due to an abnormality thereof or to a delayed response time thereof. An abnormality of the AC relay 116 can cause the cement resistor 112 to be overheated, thereby badly affecting wires and moldings around the wires and occasionally starting a fire.

The response time of the AC relay is, in general, approximately 6 ms, and is 10 ms in a slow acting type AC relay in which the contact point structure thereof is modified. That is, the bypassing switch 110 of the AC relay 116 remains OFF for 10 ms from the time that the inrush current starts to be applied to the AC relay 116, and then is turned ON. A measured output current of the control switch 108 illustrates that, as indicated by "A" in FIG. 3, an inrush current of over a predetermined magnitude is generated during at least one period of the AC power source. For example, the period for a 50 Hz power source is 20 ms. Therefore, the time needed for the inrush current to pass the cement resistor 112 should be at least 20 ms in order to prevent bad influences of the inrush current and thereby supply a stable power to the high voltage transformer. However, the maximum self-response time of a slow acting AC relay is restricted to 10 ms due to its point contact structure, and thus the inrush current cannot be effectively prevented.

Moreover, since the AC relay 116 has four tap terminals, terminal inserting processes are required to assemble it. Further, the cement resister 112 is a terminal type of two tap terminals and is mounted on the bottom surface of an electrical device chamber by screws, so terminal inserting processes and screw threading processes are required. The AC relay 116 is especially used in a mechanical microwave oven in which a DC power source cannot be used, and is generally expensive. Further, the fuse is effective in preventing a fire which can be started by an abnormality of the AC relay, but has a disadvantage in that it needs to be replaced after use.

SUMMARY OF THE INVENTION

Therefore, it is a first object of the present invention to provide an inrush current protection circuit for preventing an inrush current generated when an AC voltage is applied to a load from being applied to the load.

It is a second object of the present invention to provide an inrush current protection circuit for preventing an inrush current from flowing from a high voltage transformer which supplies a high voltage signal for driving a magnetron to the magnetron by applying the protection circuit to a power source of a microwave oven.

In order to accomplish the first object of the present invention, there is provided an inrush current protection circuit comprising:

- switching means interposed between a power source for supplying an AC signal and a load;
- path selection means for receiving an energizing signal from the power source and providing an ON/OFF control signal for the switching means to the switching means; and
- current restricting means interposed between the power source and the load, for restricting a magnitude of a current applied to the load to below a predetermined value even when an inrush current is applied to the load, the current restricting means being connected in parallel to the switching means.

The path selection means supplies a turn-ON signal after a predetermined delay time passes from the time that the AC signal is received, to the switching means which is initially OFF, and the switching means is provided to a bypassing circuit of the current restricting means. The AC signal is supplied to the load through the current restricting means for the predetermined delay time from the time that the AC signal is received, and is supplied to the load through the switching means after the predetermined delay time passes.

In order to accomplish the second object of the present invention, there is provided an inrush current protection circuit comprising:

- first switching means connected to a power source providing an AC signal, for accomplishing switching operation to intermittently supply the AC signal to a circuit connected to an output terminal;
- a high voltage transformer for boosting a voltage of an AC signal supplied to a first winding thereof and to thereby generate a high voltage power for driving a magnetron;
- second switching means interposed between the first switching means and the high voltage transformer;
- rectifying means for rectifying the AC signal provided from the power source and thereby converting the AC signal to a DC signal;

DC relay means for providing to the switching means a signal for turning ON the switching means which is energized by the DC signal provided from the rectifying means after the delay time passes from the time that the AC signal is inputted to the rectifying means and is turned OFF; and

- a positive characteristic (PTC) thermistor interposed between the first switching means and the high voltage transformer, for restricting a magnitude of a current applied to the high voltage transformer to a predetermined value even when an inrush current is applied to the transformer, by using a temperature-resistance characteristics thereof in which a resistance thereof increases in correspondence to an increase in an internal temperature thereof, the current restricting means being connected in parallel to the second switching means.

The DC relay means supplies a turn-ON signal after a predetermined delay time passes from the time that the AC signal is received by the rectifying means, to the second switching means which is initially OFF, and the second switching means is provided to a bypassing circuit of the PTC thermistor. The AC signal is supplied to the transformer through the current restricting means for the predetermined delay time from time that the AC signal is received by the rectifying means, and is supplied to the transformer through the PTC thermistor after the predetermined delay time passes.

According to the present invention, an inrush current generated when an AC voltage is intermittently supplied can be fully damped, thereby supplying a stable power to a load such as a high voltage transformer. Further, the inrush protection circuit according to the present invention employs a DC relay of low price to reduce a manufacturing cost thereof, can prevent a fire which can be started by the inrush current, and can remove the disadvantage of the conventional circuit in which a fuse should be replaced after use.

BRIEF DESCRIPTION OF THE DRAWINGS

The above object and other advantages of the present invention will become more apparent by describing in detail preferred embodiments thereof with reference to the attached drawings in which.

DETAILED DESCRIPTION OF THE INVENTION

Hereinafter, a preferred embodiment of the present invention will be explained in more detail with reference to the accompanying drawings.

Figure 1:
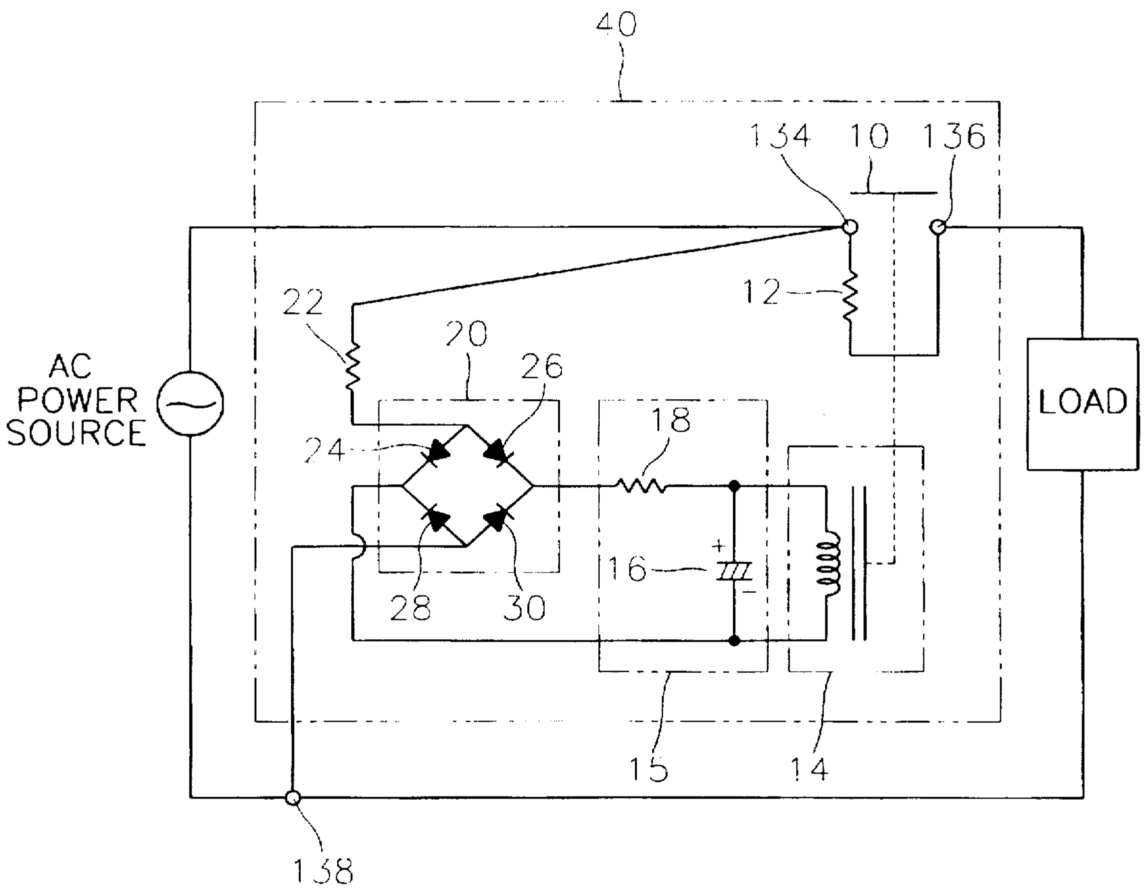
FIG. 1 is a circuit diagram of an inrush current protection circuit according to a preferred embodiment of the present invention.

FIG. 1 is a circuit diagram of an inrush current protection circuit according to a preferred embodiment of the present invention. The inrush current protection circuit 40 includes a current restricting device 12 which restricts an output current value to a predetermined one, path selection member for selecting a supply path to a load, and a switch 10 which is provided as a bypassing circuit for the current restricting device 12 and is associated with the path selection member and operated by a turn-ON signal thereof.

Contact points 134 and 136 of the switch 10 are connected to a power source for supplying an AC power and an arbitrary load, respectively.

The current restricting device is connected to the contact points 134 and 136, and is connected in parallel to the switch 10. The current restricting device 12 is accomplished by a PTC thermistor which has a positive thermal coefficient. The PTC thermistor has the following temperature-resistance characteristics. The resistance of the PTC thermistor gradually increases from an initial value when a current is flowed therein, and thus the temperature thereof rises up due to Joule heat generated therein. When the temperature of the PTC thermistor reaches approximately 120 degree Celsius, which is the Curie Temperature of the PTC thermistor, the resistance thereof rapidly increases, thereby cutting off the current. The PTC thermistor is mounted in an endurable cap which can endure the emitting temperature of the PTC thermistor. According to the temperature-resistance characteristics of the PTC thermistor, the magnitude of the output current to the load is restricted to a predetermined value even when an inrush current of over predetermined magnitude is applied from the power source, so the inflow of the inrush current to the load is cut off and a fire which can be started due to overheating of the device is prevented.

The path selection member has a resistor 22 which is connected to a contact point 134 to drop an AC voltage which is an input power source, a rectifying section 20 for rectifying the dropped AC voltage, an RC circuit 15 which drops the rectified AC voltage and evens the rectified AC voltage to delay the energized DC voltage of a predetermined magnitude by the RC time constant, and a DC relay 14 which is interposed between the RC circuit 15 and the switch 10. The rectifying section 20 has a bridge circuit 20 which uses the output terminal of the resistor 22 and an input power supply terminal 138 as input ports and also uses four diodes 24, 26, 28, and 30. Although the bridge circuit 20 is shown as a preferred embodiment of the rectifying section 20 in the figure, the rectifying section 20 is not limited to this embodiment, and any rectifying circuit for rectifying an AC signal to a DC signal can be used as the rectifying section 20.

The inrush current protection circuit 40 of the above-mentioned structure is integrally installed on a printed circuit board.

Figure 2:
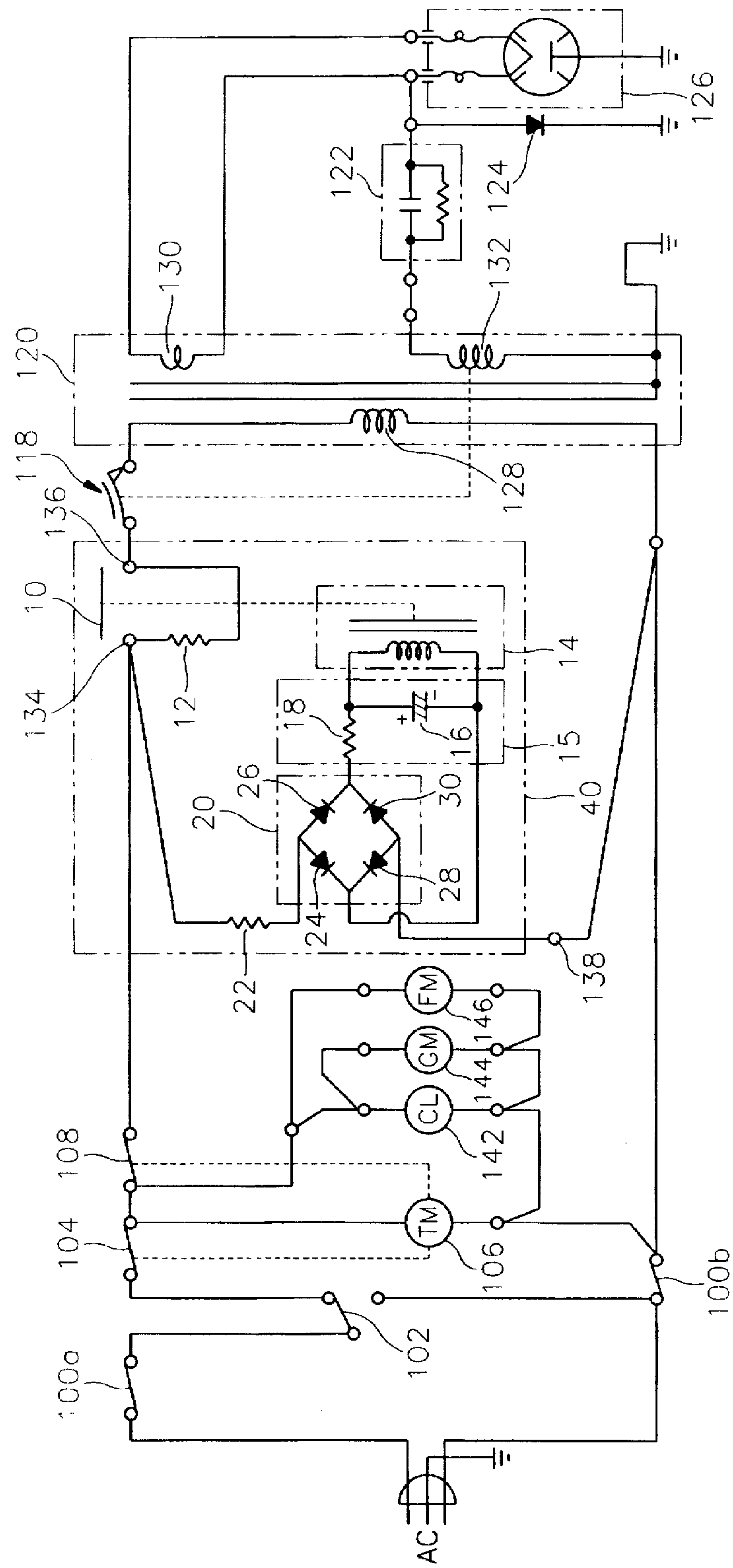
FIG. 2 is a circuit diagram of a microwave oven employing the inrush current protection circuit shown in FIG. 1.

As shown in FIG. 2, the inrush current protection circuit 40 can be applied to a power source of a mechanical microwave oven to effectively cut off an inrush current generated during intermittent power supply to a high voltage transformer 120.

Figure 4:
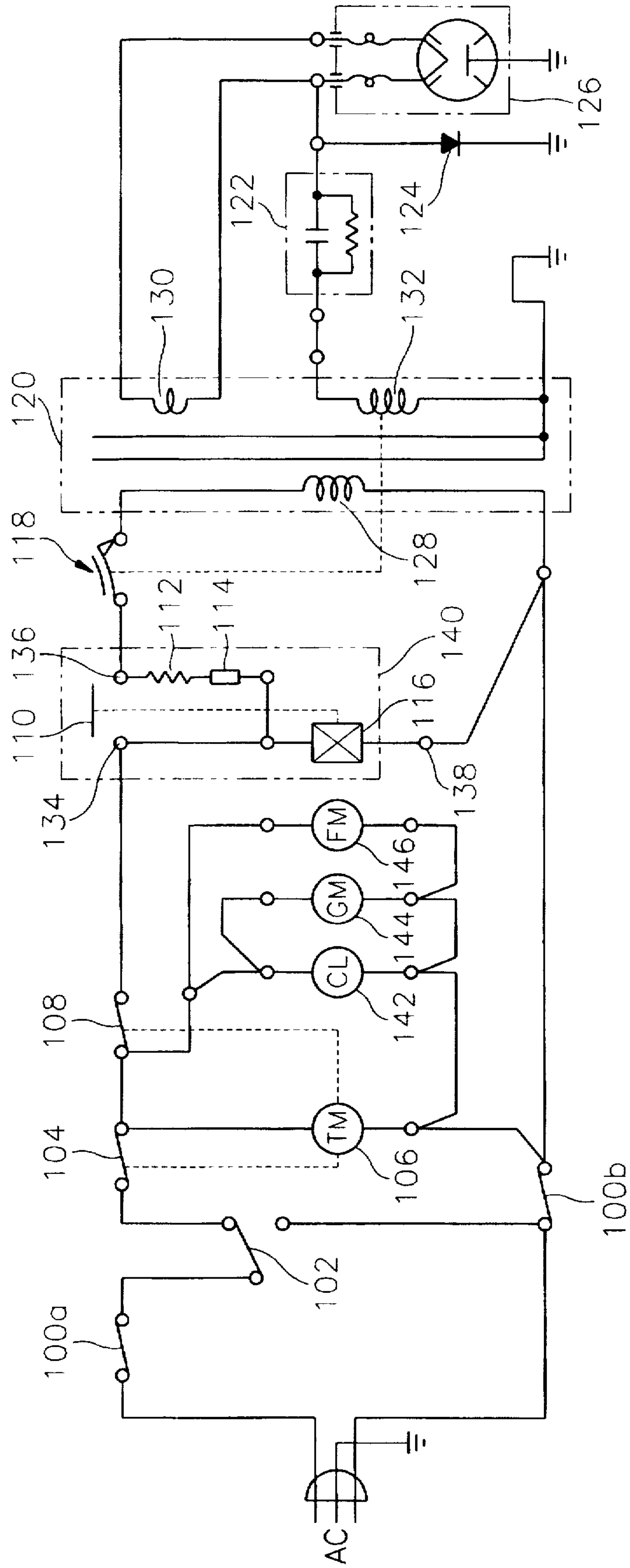
FIG. 4 is a circuit diagram of a microwave oven employing a conventional inrush current protection circuit.

In order to effectively cut off the inrush current, the conventional inrush current protection circuit 140 shown in FIG. 4 is replaced by the inrush current protection circuit 40 according to the present invention. That is, in order to damp the inrush current more fully, an AC relay 116 is replaced by the DC relay 14 and the energizing circuits 16, 18, 20, and 22 which delay an energizing current for energizing the DC relay 14 for a predetermined time and then supply the current to the DC relay 14, and a fuse 114 and a cement resistor 112 are replaced by the PTC thermistor 12.

Hereinafter, the operation of the inrush current protection circuit according to the present invention, in which the inrush current protection circuit is applied to a power source in a microwave oven, will be explained in detail.

When the microwave oven is operated, the AC voltage of 230 V is dropped to 30 V by the resistor 22 of 9.1KΩ, and the dropped AC voltage is rectified by a diode 20 and then dropped to a rectifying radio wave of 26V. The voltage of the rectifying radio wave is dropped to 24V by the resistor 18 of 100KΩ, and thus the rectifying radio wave is minimumly rippled and is evened by an electrolytic capacitor 16 and converted to a pure DC voltage. The RC circuit 15 comprising the capacitor 16 and the resistor 18 delays the DC voltage of 24V by the RC time constant and supplies it to the DC relay 14. Then, an energizing coil in the DC relay 14 is energized, and thus the DC relay supplies a turn-on signal to the switch 10. The rating voltage is 50V and the capacity thereof is 100μm.

On the other hand, experiments show that the response time of the switch 10 associated with the DC relay is approximately between 120 ms and 160 ms. It is estimated that the response time is affected by the fact that the total resistance of the devices 18, 20, and 22 disposed at the front end of the DC relay 14 affects the R value when the RC time constant is determined, and by the fact that the self-response time of the DC relay 14 is included in the total response time.

Figure 3:
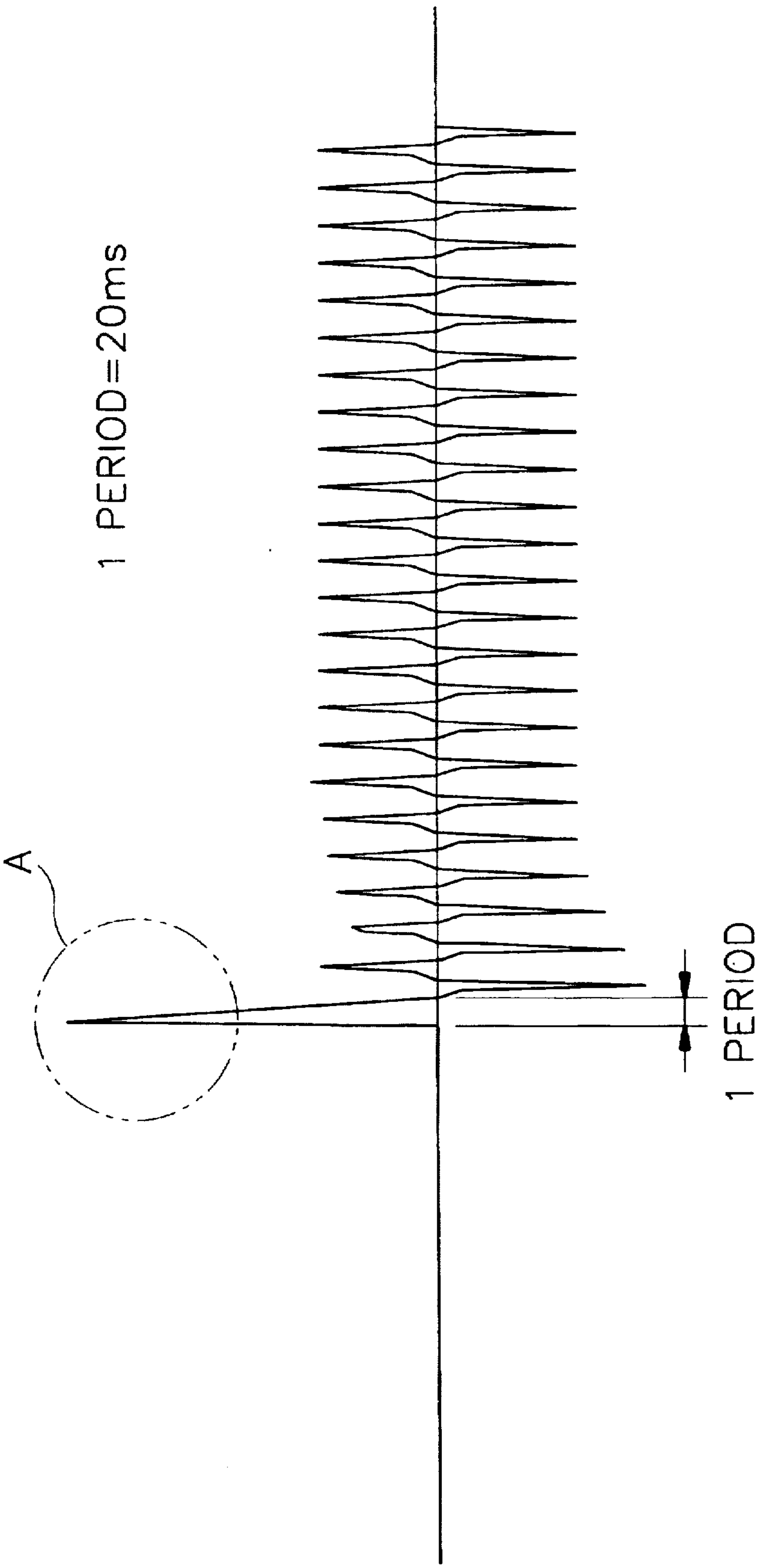
FIG. 3 is a wave diagram of an AC power source including an inrush current to be damped by the present invention.

The above-mentioned inrush current protection circuit 40, as shown in FIG. 2, is interposed between a variable power control switch 108 and a first winding 128 of the high voltage transformer 120. In the power source, when the control 108 is switched from ON to OFF, an inrush current is initially generated as indicated by "A" in FIG. 3. The DC relay 14 is not energized during the response time of 120 ms to 160 ms since an inrush current is applied to the DC relay 14, and the switch 10 remains OFF. Consequently, the drive current including the inrush current provided from the control switch 108 to the first winding 128 of the high voltage transformer 120 is damped to a current of a stable magnitude while it is passing through the PTC thermistor 12. The switch 10 is switched to ON by a turn-on signal provided by the energized DC relay 14 from the time that the response time ends, and the drive current is bypassed through the switch 10. According to experiments, the duration of the inrush current is approximately within 30 ms. The inrush current protection circuit 40 is employed in the power supply of the microwave oven to fully cut off the inrush current.

Further, even if the DC relay 14 is not operated during the response time due to abnormality thereof and therefore, the drive current flows, instead of through the switch 10, through the PTC thermistor 12 for a long time, the resistance of the PTC thermistor 12 rapidly increases from the time the temperature thereof reaches Curie temperature, thereby cutting off the drive current to the high voltage transformer 120. Consequently, when the DC relay 14 is abnormally operated, the PTC thermistor 12 functions as a fuse.

On the other hand, the heat generated in the PTC thermistor 12 is not emitted outside due to the existence of the heat-resistant cap, so the surrounding temperature of the PTC thermistor 12 remains high, which affects the wires of the power source circuit and surrounding moldings badly.

The voltage of the drive signal, the inrush current of which is damped by the inrush current protection circuit 40, is boosted by the high voltage transformer, and the voltage-boosted drive signal is supplied to the magnetron 126 though a high voltage capacitor 122 and a high voltage diode 124, and thus the magnetron 125 is operated to cook foods.

As above-mentioned, according to the inrush current protection circuit of the present invention, the inrush current initially generated when the AC voltage is applied to the load is fully cut off by the DC relay which can be purchased at a low price and the PTC thermistor of positive temperature-resistance characteristics. Further, when the inrush current protection circuit according to the present invention is employed in a power source of a microwave oven, the flickering of the power source can be effectively prevented. However, the present invention is not limited to an inrush protection circuit used in the power source of a microwave oven.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. An inrush current protection circuit comprising:

a switch interposed between a power source for supplying an alternating current signal and a load;

path selection means for receiving an energizing signal from the power source and providing an ON/OFF control signal for controlling the switch; and current restricting means interposed between the power source and the load, for restricting a magnitude of a current applied to the load to below a predetermined value even when an inrush current is applied to the load, the current restricting means being connected in parallel to the switch;

the path selection means supplying a turn-ON signal, after a predetermined delay time passes from the time that the alternating current signal is received, to the switch which is initially OFF, the switch being provided to a bypassing circuit of the current restricting means, the alternating current signal being supplied to the load through the current restricting means for the predetermined delay time from the time that the alternating current signal is received and being supplied to the load through the switch after the predetermined delay time passes, wherein the path selection means comprises rectifying means for converting the alternating current signal provided from the power source to a direct current signal and providing the direct current signal to a direct current relay section and direct current relay means for providing to the switch a signal for turning ON the switch which is energized by the direct current signal provided from the rectifying means after the delay time passes from the time that the alternating current signal in inputted to the rectifying means and is turned OFF, wherein the rectifying means comprises a resistor for dropping a voltage of the power source to a predetermined magnitude, and a rectifying section for rectifying the alternating current signal voltage-dropped by the resistor and for generating an energizing direct current, wherein the rectifying section is a bridge circuit having a plurality of diodes, wherein the rectifying section comprises a circuit interposed between an output terminal of the bridge circuit and the direct current relay means and having a resistor and a capacitor, for damping an alternating current component included in a signal rectified by the bridge circuit and extending a response time of the direct current relay means by a predetermined time.

2. An inrush current protection circuit according to claim 1, wherein the current restricting means is a positive characteristic thermistor having a temperature-resistance characteristic in which a resistance thereof increases according to an increase in an internal temperature thereof.

3. An inrush current protection circuit comprising:

switching means interposed between a power source for supplying an alternating current signal and a load;

rectifying means for rectifying the alternating current signal and thereby converting the alternating current signal provided from the power source to a direct current signal;

DC relay means for providing to the switching means a signal for turning ON the switching means which is energized by the direct current signal provided from the rectifying means after the delay time passes from the time that the alternating current signal is inputted to the rectifying means and is turned OFF; and a positive characteristic thermistor interposed between the power source and the load, for restricting a magnitude of a current applied to the load to below a predetermined value even when an inrush current is applied to the load by using a temperature-resistance characteristics thereof in which a resistance thereof increases corresponding to an internal temperature thereof, the current restricting means being connected in parallel to the switching means;

the direct current relay means supplying a turn-ON signal, after a predetermined delay time passes from the time that the alternating current signal is received by the rectifying means, to the switching means which is initially OFF, the switching means being provided to a bypassing circuit of the positive characteristic thermistor, the alternating current signal being supplied to the load through the current restricting means for the predetermined delay time from time that the alternating current signal is received by the rectifying means, and being supplied to the load through the positive characteristic thermistor after the predetermined delay time passes.

4. An inrush current protection circuit according to claim 3, wherein the rectifying means comprises a resistor for dropping a voltage of the power source to a predetermined magnitude, a rectifying circuit for rectifying the alternating current signal voltage-dropped by the resistor and generating an energizing direct current, and a circuit interposed between an output terminal of the rectifying circuit and the direct current relay means and having a resistor and a capacitor, for damping an alternating current component included in a signal rectified by the rectified circuit and extending a response time of the direct current relay means by a predetermined time.

5. An inrush current protection circuit comprising:

first switching means connected to a power source providing an alternating current signal, for accomplishing switching operation to intermittently supply the alternating current signal to a circuit connected to an output terminal;

a high voltage transformer for boosting a voltage of an alternative current signal supplied to a first winding thereof to thereby generate a high voltage power for driving a magnetron;

second switching means interposed between the first switching means and the high voltage transformer;

rectifying means for rectifying the alternating current signal provided from the power source and thereby converting the alternating current signal to a direct current signal;

direct current relay means for providing to the switching means a signal for turning ON the switching means which is energized by the direct current signal provided from the rectifying means after the delay time passes from the time that the alternating current signal is inputted to the rectifying means and is turned OFF; and a positive characteristic thermistor interposed between the first switching means and the high voltage transformer, for restricting a magnitude of a current applied to the high voltage transformer to a predetermined value even when an inrush current is applied to the transformer by using a temperature-resistance characteristics thereof in which a resistance thereof increases according to an increase in an internal temperature thereof, the current restricting means being connected in parallel to the second switching means, the direct current relay means supplying a turn-ON signal, after a predetermined delay time passes from the time that the alternative current signal is received by the rectifying means, to the second switching means which is initially OFF, the second switching means being provided to a bypassing circuit of the positive characteristic thermistor, the alternative current signal being supplied to the transformer through the current restricting means for the predetermined delay time from the time that the alternative current signal is received by the rectifying means, and being supplied to the transformer through the positive characteristic thermistor after the predetermined delay time passes.

6. An inrush current protection circuit according to claim 5, wherein the rectifying means comprises a resistor for dropping a voltage of the power source to a predetermined magnitude, a rectifying circuit for rectifying the alternating current signal voltage-dropped by the resistor and generating an energizing direct current, and a circuit interposed between an output terminal of the rectifying circuit and the direct current relay means and having a resistor and a capacitor, for damping an alternating current component included in a signal rectified by the rectified circuit and extending a response time of the direct current relay means by a predetermined time.

* * * * *